United States Patent Office 2,710,274
Patented June 7, 1955

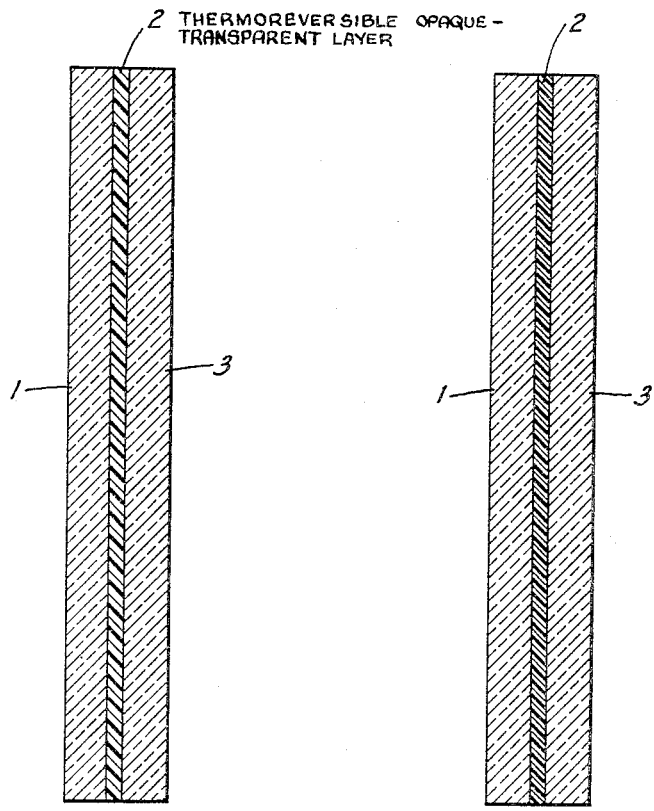

2,710,274

MULTI-LAYER GLASS SHEET

Georg Walter Kuehl, Landshut, Bavaria, Germany

Application March 26, 1952, Serial No. 278,751

16 Claims. (Cl. 154—2.77)

This invention relates to a multi-layer glass sheet and more particularly to a multi-layer glass sheet the transparency of which is reversibly variable with changes in temperature and/or luminous intensity.

Multi-layer glass sheets or compound glass consisting of two silicate glass sheets or glass sheets made of synthetic resins, for instance, of acrylic acid resins as they are known under the trade name "Plexiglas," and of an interlayer uniting said two glass sheets are known. Said interlayer, heretofore, was made of a colorless material, and great importance was attached to the application of an especially clear and transpartent interlayer material. Colored transparent multi-layer glass sheets were used, for instance, as glare shields in motor driven vehicles and the like.

It is one object of this invention to provide a new multi-layer glass sheet or compound glass to be used, for instance, as windowglass for windows, doors, sky-lights or the like of buildings or of vehicles, especially of motor driven vehicles, the transparency of said multi-layer glass sheet or compound glass being reversibly variable with changes in luminous intensity and/or temperature, said new multi-layer glass sheet or compound glass being useful for various purposes and in various ways.

Another object of this invention is to provide a multi-layer glass sheet or compound glass consisting of two external glass sheets and an intermediate layer, said intermediate layer consisting of or containing a material capable of reversibly varying the transparency of said multi-layer glass sheet or compound glass with changes in temperature and/or luminous intensity.

A further object of this invention is to provide a multi-layer glass sheet which, on exceeding a certain temperature and/or luminous intensity, becomes opaque, so that it acquires the appearance of an opalescent or milk-glass and prevents free admission of sun light, for instance, into workrooms, greenhouses, hot-beds or the like.

Still another object of this invention is to provide a multi-layer glass sheet that assumes a specific color or that changes its color on exceeding a certain temperature and/or luminous intensity.

It is an essential characteristic of this invention that said changes in transparency and/or in coloration and the like are reversible so that the multi-layer glass sheet, on reaching a temperature and/or luminous intensity below the temperature and/or luminous intensity whereby said changes in transparency and/or coloration occur, again assumes its original appearance, properties, and form.

Other objects of this invention will hereinafter become evident from the specification and the examples given therein.

The attached drawings serve to illustrate a multi-layer glass sheet acccording to the present invention. In said drawings—

Fig. 1 is a cross-sectional view of a transparent, optically homogeneous multi-layer glass sheet and Fig. 2 is a cross-sectional view of the same multi-layer glass sheet after its exposure to heat whereby it becomes opaque.

An intermediate layer of such multi-layer glass sheets is provided, according to the present invention, in the form of a film 2 which unites the two external glass plates 1 and 3 or the like as this is usually done when making compound glass consisting of several layers. It is, however, also possible to arrange the two glass plates 1 and 3 at a certain distance from each other, to seal them at their rims, and to fill up the hollow space formed between said glass plates by said intermediate layer 2. In this case, the intermediate layer does not firmly unite said two glass plates.

When using a film as intermediate layer for uniting the external glass plates with each other, said film is arranged and produced between said glass plates in the following manner. For instance, the components forming the intermediate film may be poured, in thinly liquid condition, into the space between the glass plates formed by uniting the rims of said glass plates. The liquid material is then converted into a film between said glass plates by cooling or by polymerisation or condensation. It is furthermore possible to pour a solution of the material comprising the intermediate film upon one of the two external glass plates, evaporating the solvent from said solution preferably by drying the coated glass plate at elevated temperature so as to produce a thin film, and then pressing the second glass plate upon said film-coated first glass plate. Likewise, both plates may be coated with a film solution. They are then, after the solvent is evaporated, placed together with their coated faces and are united with each other. Furthermore, a preformed film may be united with the two external glass plates to a multi-layer glass sheet. Of course, in the place of said two glass plates any other suitable material may be used.

Changes in the transparency of the intermediate layer are effected in an especcially suitable manner by changes in temperature. It is, therefore, of advantage to admix to the intermediate layer substances which have the property to absorb light and which thereby convert such light into heat. Copper sulfate is especially suitable for this purpose.

The intermediate layer, according to a preferred embodiment of this invention, contains substances which, at a certain temperature, are reversibly converted from the sol state to the gel state or from the gel state to the sol state respectively. To achieve this effect, the intermediate layer contains, for instance, polymer compounds and compounds capable of forming with said polymer compounds addition products which are reversibly decomposed on changes in temperature. When using an excess of said polymer compounds, the additional compounds are present in the disperse phase while, when using an excess of said additional compounds, the polymer compounds are present in the disperse phase.

For the purpose of displacing the point of conversion, the intermediate layer may contain one or more substances which are capable of favorably or unfavorably influencing the sol state. Emulsifying agents may also be added to the intermediate layer so as to cause fine and uniform separation of the disperse phase and, thus, dense and constant turbidity. Salts of alkyl sulfonates or neutral salts of derivatives of naphthalene sulfonic acid, such as they are, for instance, produced and marketed by Badische Anilin- & Soda-Fabrik, Ludwigshafen, under the trade names "Cyclanon" and "Tamol" have been advantageously employed as such emulsifying agents.

Especially suitable polymer compounds which are capable of forming the above mentioned addition products with certain other compounds, are, for instance, methyl polyvinyl ethers, polyglycol ethers, salts of polyacrylic acids with alkaline earth metals, polyvinyl acetaldehyde acetal resins, polyvinyl alcohols which are partly condensed with acetaldehyde to acetal compounds, and others more.

Furthermore, according to the present invention, the transparency of the intermediate film may be varied by using an intermediate layer material the color of which changes reversibly at a certain temperature and/or luminous intensity. Such an embodiment of the invention, for instance, is of importance with multi-layer glass sheets to be used as glare shields, furthermore as shop-window plates to protect the exhibited goods against light of certain wave lengths.

Such an intermediate layer, to be capable to change its color, contains preferably a water attracting solvent, such as methanol, or hydrogen chloride, as well as a salt containing water of crystallisation, said salt in the anhydrous state having another color than in the hydrated state so that the water, according to the temperature, is absorbed either by the salt or by the solvent.

According to another embodiment of this invention, the intermediate layer may also contain indicator substances and salts the pH-value of which varies under the influence of heat. Thereby, a salt or a dyestuff may be added to the intermediate layer, said salt or dyestuff having a color which is complementary to the basic color of the intermediate layer, thus causing said intermediate layer to appear colorless under normal conditions. Said complementary color may also be arranged in a separate layer.

Changes in the transparency of the intermediate layer may furthermore be caused by adding to said intermediate layer substances which, on exposure to light, are reversibly photochemically converted thereby forming substances of different transparency.

The intermediate layer may, for instance, contain leucocyanides or carbinol bases of certain dyestuffs, such as the leucobases of pararosaniline, crystal violet, malachite green, brilliant green, victoria blue and others. One may also add a mixture of several dyestuffs to the intermediate layer, for instance, a mixture of the leucocyanide of victoria blue and the leucocyanide of malachite green. Thereby it is advisable to admix to the intermediate layer or, for instance, to an alcoholic solution used when placing together the plates and the intermediate layer, potassium cyanide or, in the case of carbinols, potassium hydroxide so as to catalytically accelerate the reaction in the dark.

Other substances which may be admixed to the intermediate layer and which are reversibly photochemically changed on exposure to light, are, for instance, the following: benzaldehyde phenylhydrazone, anisil osazone, i. e. dyestuffs which, when not exposed to light, have a slightly yellowish or grayish-white color but which, on exposure to light, take on a more or less intensely red color.

The following examples illustrate the invention without, however, limiting the same to them.

A. *Intermediate layers which are reversibly converted from the sol state to the gel state*

To produce intermediate layers which, on exceeding a certain temperature and/or luminous intensity, are reversibly converted from the sol state to the gel state or conversely from the gel state to the sol state, mixtures of the following substances are made. Said mixtures are thinly liquid at a temperature of about 80° C. and are poured between two plates sealed together at their rims. The space between said two plates is preferably between about 0.4 mm. and about 0.8 mm. The intermediate layers solidify at about 40° C. but liquefy only on heating to about 85–100° C.

The composition of such mixtures as well as the temperature of conversion whereby the multi-layer glass plate made therewith becomes opaque, are given in the following examples. Furthermore, the opaqueness or denseness of the opaque plates is given whereby the opaqueness or denseness of a conventional focussing screen is assumed to be 1.0.

| | | | |
|---|---|---|---|
| 1 | Methyl polyvinyl ether<br>emulsifying agent<br>glycol<br>agar-agar<br>water | 2.45 g.<br>1.90 g.<br>30.00 cc.<br>6.00 g.<br>339.65 g. | Denseness: 1.0. Temperature of conversion: 31° C. |
| 2 | Methyl polyvinyl ether<br>emulsifying agent<br>glycol<br>agar-agar<br>water | 2.45 g.<br>1.90 g.<br>60.00 cc.<br>6.00 g.<br>309.65 g. | Denseness: 1.0. Temperature of conversion: 29° C. |
| 3 | Methyl polyvinyl ether<br>emulsifying agent<br>glycol<br>agar-agar<br>water | 2.45 g.<br>1.90 g.<br>80.00 cc.<br>6.00 g.<br>290.35 g. | Denseness: 1.0. Temperature of conversion: 25° C. |
| 4 | Methyl polyvinyl ether<br>emulsifying agent<br>glycol<br>agar-agar<br>water | 2.45 g.<br>1.90 g.<br>120.00 cc.<br>6.00 g.<br>241.65 g. | Denseness: 1.0. Temperature of conversion: 18° C. |
| 5 | Methyl polyvinyl ether<br>emulsifying agent<br>glycerol<br>agar-agar<br>water | 2.45 g.<br>1.90 g.<br>30.00 cc.<br>6.00 g.<br>339.65 g. | Denseness: 1.0. Temperature of conversion: 30° C. |
| 6 | Methyl polyvinyl ether<br>emulsifying agent<br>glycerol<br>agar-agar<br>water | 2.45 g.<br>1.90 g.<br>60.00 cc.<br>6.00 g.<br>209.65 g. | Denseness: 1.0. Temperature of conversion: 28° C. |
| 7 | Methyl polyvinyl ether<br>emulsifying agent<br>glycerol<br>agar-agar<br>water | 2.45 g.<br>1.90 g.<br>80.00 cc.<br>6.00 g.<br>290.35 g. | Denseness: 1.0. Temperature of conversion: 24° C. |
| 8 | Methyl polyvinyl ether<br>emulsifying agent<br>glycol<br>agar-agar<br>water | 3.22 g.<br>1.50 g.<br>80.00 cc.<br>6.00 g.<br>289.28 g. | Denseness: 2.5. Temperature of conversion: 25° C. |
| 9 | Methyl polyvinyl ether<br>emulsifying agent<br>glycol<br>agar-agar<br>water | 3.22 g.<br>1.50 g.<br>100.00 cc.<br>6.00 g.<br>269.28 g. | Denseness: 2.5. Temperature of conversion: 22° C. |
| 10 | Methyl polyvinyl ether<br>emulsifying agent<br>glycol<br>agar-agar<br>water | 3.22 g.<br>1.50 g.<br>120.00 cc.<br>6.00 g.<br>249.28 g. | Denseness: 2.5. Temperature of conversion: 18° C. |
| 11 | Methyl polyvinyl ether<br>emulsifying agent<br>glycerol<br>agar-agar<br>water | 3.22 g.<br>1.50 g.<br>80.00 cc.<br>6.00 g.<br>289.28 g. | Denseness: 2.5. Temperature of conversion: 24° C. |
| 12 | Methyl polyvinyl ether<br>emulsifying agent<br>glycerol<br>agar-agar<br>water | 3.22 g.<br>1.50 g.<br>100.00 cc.<br>6.00 g.<br>269.28 g. | Denseness: 2.5. Temperature of conversion: 19° C. |

As is evident from the above given examples the temperature of conversion is decreased by the addition of glycol and even more so by the addition of glycerol and is adjusted by varying the amounts of said additions.

Of course, a multi-layer glass plate according to this invention may be made by pouring or applying the liquid mixture at a temperature of about 80° C. upon one plate, cooling said coated plate to about 40° C. to solidify the coating, and producing a thin film upon said plate by heat-drying between about 60° C. and about 70° C. Such a casting solution, for instance, is composed of the following ingredients:

```
                                                Grams
Methyl polyvinyl ether _____ 10.0
Emulsifying agent _____  5.0
Agar-agar _____  6.0
Water _____ 300.0
```

A second plate is placed upon the plate having said film attached thereto, thereby using water as binding and dissolving agent and the two plates are pressed together under moderate pressure. In this manner the two plates are very firmly united with each other. Substances capable of favoring or obstructing gel formation are added to said water. It is possible to adjust the opaqueness of said compound glass or multi-layer glass sheet to any desired degree either by varying the thickness of said intermediate layer or, when using an intermediate layer of the same thickness, by varying the content of methyl polyvinyl ether of said casting solution.

In this case, the temperature of conversion is adjusted by adding larger or smaller amounts of substances having a favorable influence upon gel formation, such as, for instance, glycol or glycerol, to the water used for uniting the plates. Polyglycols or monovalent alcohols and other substances may be added to said water to hinder gel formation. A compound glass obtained in this manner is adapted to be cut at any place and in any desired direction.

A further possibility for producing the intermediate layer consists in providing only one or both plates with a water containing layer of methyl polyvinyl ether, for instance, by pouring a cold, aqueous solution of said methyl polyvinyl ether upon a plate and allowing the layer to dry on the air. If required, an emulsifying agent is added to said aqueous solution of said methyl polyvinyl ether. As is evident, in contrast to the mixtures given in the above mentioned examples, the content of methyl polyvinyl ether by far exceeds the water content in said layers. Depending upon the water content remaining in said layers, the temperature of conversion is different and can be adjusted to any desired temperature by varying said water content. The plates provided with the methyl polyvinyl ether layer are preferably united with each other by subjecting them to pressure in an autoclave.

A methyl polyvinyl ether solution suitable for producing such intermediate layers has, for instance, the following composition: 1000 cc. of a 5.7% methyl polyvinyl ether solution in water and 300 cc. of a 5.0% solution of an emulsifying agent in water.

It is also possible to vary the temperature of conversion by varying the content of emulsifying agent in said solution while the water content remains the same.

A further possibility of producing sensitive intermediate layers consists in using water containing polyglycol ethers. If a certain temperature depending upon the other components in said solution is exceeded, water is separated in colloidal form causing opaqueness and whitish coloration of the layer. Said polyglycol ether-water mixture may be introduced into a suitable medium capable of forming a film, such as, for instance, polyvinylbutyraldehyde acetal.

For instance, 100 parts of a polyglycol ether solution as it is marketed by the Badische Anilin- und Sodafabrik, Ludwigshafen, under the trade name "Emulphor A," are mixed with 5 parts of water. Said mixture is brought between two plates being cemented together at their rims to form a very thin layer of about 0.08 mm. thickness. A foil of polyvinyl butyraldehyde acetal may be used for causing such cementing of the rims. A multi-layer sheet obtained in this manner becomes reversibly opaque at a temperature of about 75° C. Said temperature of conversion may be displaced towards higher temperatures by an addition of, for instance, ethanol whereby the added amount of ethanol determines the temperature of conversion.

According to a further embodiment of this invention an alkaline earth compound of polyacrylic acid, for instance, the magnesium polyacrylate, may be used as intermediate layer. Said alkaline earth compound also possesses the property to be converted from the sol state into the gel state on exceeding a certain temperature whereby said temperature is also dependent upon the other components of said solution.

For instance, 5 g. of polyacrylic acid, 0.82 g. of magnesium oxide, and 94.18 g. of water are mixed with each other. The solution is poured upon a glass plate and is dried at about 70° C. A second plate is then placed upon the first plate while using water as dissolving and binding agent, and the two plates are pressed together under moderate pressure. A multi-layer glass plate is obtained having a temperature of conversion of about 70° C. and a denseness or opaqueness of about 3, in relation to a normal focussing screen plate. The alkaline earth polyacrylate may be dissolved in a solution of an alkali polyacrylate to decrease the denseness or opaqueness. It is furthermore possible to decrease the temperature of conversion to any desired degree by adding larger or smaller amounts of monovalent or polyvalent alcohols, for instance, of ethanol, glycol, glycerol, to the water. An increase in the temperature of conversion, on the other hand, is achieved by the addition of certain other compounds, such as, for instance, polymerized glycol.

Multi-layer glass sheets having an intermediate layer of polyvinyl acetaldehyde acetal resins or polyvinyl alcohols partly condensed to acetals by means of acetaldehyde, are produced by mixing, for instance, the following amounts of a 10% aqueous solution of polyvinyl alcohol, of pure acetaldehyde, and of N hydrochloric acid:

| Example | 1 | 2 | 3 | 4 | 5 | 6 |
| --- | --- | --- | --- | --- | --- | --- |
| Polyvinyl alcohol____parts__ | 40 | 40 | 40 | 40 | 40 | 40 |
| Acetaldehyde_____do____ | 20 | 13 | 10 | 5 | 3 | 2 |
| N hydrochloric acid____do____ | 3 | 3 | 3 | 3 | 3 | 3 |

The amounts of polyvinyl alcohol as stated in the above given table are reacted at room temperature with the corresponding amounts of acetaldehyde and with N hydrochloric acid as catalyst. Examples 1 to 3 yield polymerisation products which are, for practical purposes, insoluble in water while their capacity of swelling in water increases from Example 1 to Example 3. Examples 4 to 6 yield products which are soluble in cold water whereby their solubility increases from Example 4 to Example 6.

According to Examples 1 to 3, the acetal precipitates, after reacting for about ½ hour, in a voluminous form, thereby caking together. It is washed by continuous kneading with hot water, is freed from said water by pressing, and is dissolved in sufficient amounts of methanol or ethanol to form a highly viscous solution that can be poured. To said solution there is added, if required, a suitable plasticizer, such as diacetone alcohol, for instance, in the proportion of 10 parts of plasticizer to 100 parts of solution. The solution is then poured upon a level glass plate thereby producing a film of about 0.2 mm. to about 0.4 mm. thickness. The dried film is superficially swollen by immersion into water and is placed between two glass plates. It is cemented to said glass plates by means of an indifferent adhesive, for instance, gelatine or a urea-formaldehyde condensation product, whereby polyalcohols are preferably added to said adhesive. The glass plates and the intermediate film layer are then pressed together under moderate pressure. According to the swelling capacity of the acetal, increasing amounts of water are added to the compositions obtained according to the above mentioned Examples 1 to 3. Thereby different temperatures of conversion are achieved. The lower the water content, the higher is the temperature of conversion. Said temperature of conversion may also be increased by the addition of, for instance, of ethanol, diacetone alcohol, polyglycol butyl ether, and many other compounds.

When producing the water soluble products according to the above given Examples 4 to 6, one proceeds in such a manner that the acetal which is formed while the viscosity of the reaction solution increases, is precipitated by heating said reaction solution. It is washed in the same manner as described above, by continuous kneading with hot water. After cooling a highly viscous mass is obtained the water content of which is reduced by drying or increased by the addition of water to about 20%. Said water containing mass is placed between two glass plates and is pressed in the cold under a pressure of about 150 atmospheres. Thereby a film having a thickness of about 0.14 mm. is formed. The water soluble products as well as the water insoluble products can be dissolved in alcohol and a film can be formed from said solution upon a glass plate in the manner described above. A cover plate is then placed upon said plate provided with said film. Thereby an aqueous 5–10% polyvinyl alcohol solution is used as binding liquid. It is advisable to protect the rims of said multi-layer plate against desiccation of the intermediate layer at the border parts by applying a protective coating thereto, for instance, by coating thereon a methacrylic acid methyl ester emulsion adjusted to soft consistency or by applying a metal foil.

As has been explained above, changes in the transparency of the intermediate layer are effected in an especially advantageous manner by effecting changes in temperature. To increase the reactivity of said intermediate layers, larger or smaller amounts of substances which are capable of absorbing red or ultrared light respectively, are added thereto. Such substances are, for instance, copper acetate, nickel acetate, and others, if necessary, with the addition of triethanol amine. Dyestuffs, such as fluoresceine, may also be employed for this purpose. The following example serves to illustrate an intermediate layer containing substances capable of absorbing red and ultrared light:

| | | |
|---|---|---|
| Methyl polyvinyl ether | g | 3.22 |
| Emulsifying agent | g | 1.50 |
| Glycerol | cc | 80.00 |
| Agar-agar | g | 6.00 |
| Water | g | 289.28 |
| Copper acetate | g | 30.00 |
| Triethanol amine | g | 15.00 |

B. *Intermediate layers the color of which is reversibly changed*

Intermediate layers the color of which is reversibly changed, are, for instance, produced in the following manner:

125 g. of polyvinyl butyraldehyde acetal and 16 g. of cobalt chloride containing water of crystallisation ($CoCl_2.6H_2O$) are dissolved in 200 cc. of ethanol (specific gravity: 0.810). 5 to 20 cc. of water are added to said solution according to the desired point at which change in color shall take place. A film made of polyvinyl butyraldehyde acetal that does not contain any plasticizer, is immersed into said solution. Thereby said film starts to swell on both sides. It is then placed between two glass plates and the plates and intermediate layer are united by pressing them together at a temperature of about 40° C. and while applying moderate pressure. A compound glass is obtained which, in the cold, is of slightly pinkish color but which, on heating, changes its color to a more or less intense blue.

According to another embodiment of this invention, 200 cc. of ethanol (specific gravity: 0.810), 125 g. of polyvinyl butyraldehyde acetal, and 16 g. of cobalt chloride containing water of crystallisation ($CoCl_2.6H_2O$) are dissolved by heating under reflux on the water bath. The viscous liquid obtained thereby is poured upon a glass plate to form a film. Said film, after drying, is immersed in a plasticizer, for instance, in polyglycol butyl ether which contains a solvent, 10% of methanol, and water in an amount necessary to produce the desired conversion point, for instance, 10%, and placed between two glass plates. The multi-layer glass sheet is then united by pressing at a temperature of between 40° C. and 50° C. In this manner a multi-layer glass sheet is obtained which, in the cold, is of pale pinkish color but changes its color to a more or less intense blue when heated, in accordance with the temperature attained.

An intermediate layer with indicators and salts, the pH-value of which varies with variations in temperature is produced, for instance, as follows:

3 parts of sodium bicarbonate are dissolved in a solution of 50 parts of polyvinyl butyraldehyde acetal, 10 parts of diacetone alcohol, and 5 parts of water in 50 parts of methanol. 0.05% of an indicator, for instance, phenolphthaleine are added to said solution. A film cast from said solution is dried and immersed in 85% methanol or ethanol. The film is then placed between two glass plates and firmly united with said plates by subjecting the same to moderate pressure at a temperature of 35° C.

In order to compensate for or to eliminate the color of the intermediate layer, such an amount of naphthol green is added to a film-forming solution according to the above given example that the pale pinkish color of the cold solution is changed to a grayish color. With films made therefrom multi-layer glass sheets of almost colorless appearance are obtained which, on heating, take up a bluish green color.

It is also possible to use two films in order to compensate for or to eliminate the color of the one film. The one of these films is produced according to the example given above and has a slightly pinkish color. The other film is, for instance, a polyvinyl butyraldehyde acetal film which has been dyed with naphthol green. Preferably a cellulose acetate film is placed between said two colored acetal films. The color shade and coloring power of said films is selected and adjusted in such a manner that the pink coloration of the first film is exactly compensated. By using said two differently colored films as intermediate layers, a multi-layer glass sheet is obtained which, for all practical purposes, appears colorless.

C. *Intermediate layers which are reversibly photochemically converted*

5 parts of malachite green are, for instance, dissolved in 500 parts of water while heating. 2 parts of potassium cyanide are added to said solution. The pale greenish-blue voluminous precipitate is filtered off and washed with hot water containing potassium cyanide. Said precipitate is dried at 105° C. 3 parts thereof are dissolved in a solution of 50 parts of polyvinyl butyraldehyde acetal in 50 parts of methanol and 10 parts of diacetone alcohol. A film is cast from said solution on a level glass plate. Said film, after drying, is placed between two glass plates, thereby using methanol or ethanol as binding liquid, and the glass plates with the intermediate layer are firmly united by subjecting them to a moderate pressure at a temperature of about 40° C.

According to another embodiment of this invention, 5 parts of malachite green and 5 parts of victoria blue are dissolved in 1000 parts of hot water. 5 parts of potassium cyanide are added to said solution. The flocculent voluminous precipitate is filtered while still hot and is washed with hot water containing potassium cyanide. It is dried at 105° C. and is dissolved in 100 parts of 85% methanol while heating. 50 parts of polyvinyl butyraldehyde acetal and 15 parts of polyglycol butyl ether are dissolved in said solution while boiling under reflux. Said mixture yields, in the same manner as described above, a film which forms the intermediate layer of a multi-layer glass sheet.

The films obtained according to the above given examples are united with two glass plates to a multi-layer glass sheet whereby methanol or ethanol containing about 1% of potassium cyanide is used as binding and uniting liquid, said addition of potassium cyanide catalytically accelerating the reaction in the dark. The multi-layer glass sheet is obtained from said glass plates and intermediate film layers by subjecting the same to moderate pressure at about 40° C. Another example of an intermediate layer capable of photochemically varying the transparency may be obtained in the following manner:

1 part of benzaldehyde phenylhydrazone is dissolved in 100 parts of methanol or ethanol. Said solution is heated under reflux with 60 parts of polyvinyl butyraldehyde acetal until a highly viscous solution that can be poured is obtained. A film is produced from said solution in the manner described above. Said film, after drying, is placed between two glass plates and is united therewith by using methanol or ethanol as binding and cementing liquid and by subjecting said glass plates and intermediate layer to moderate pressure at a temperature of about 40° C.

Of course, many changes and variataions may be made in the components used, the reaction conditions employed and the like by those skilled in the art in accordance with the principles set forth herein and in the claims annexed hereto.

In the place of copper sulfate to be used as substance which has the property to absorb light and to convert such absorbed light into heat, other compounds, such as ferrous compounds, e. g. ferrosulfate, ferroammoniumsulfate; or nickel salts, e. g. nickel sulfate, acetate of nickel, nickel chloride; or cobalt salts, e. g., cobalt chloride or complex cobalt compounds, as well as organic dyestuffs or coloring agents such as naphthol green may be used.

In the place of the emulsifying agents to be added to the intermediate layer and mentioned above, there may be used other emulsifying agents, such as glycololeate.

In the place of the above mentioned polymer compounds there may be used, among others, polyvinylbutyraldehydeacetal or polyvinylalcohol partially acetalized with butyraldehyde, salts of alkaline earths of methacrylic acid or mixtures of these substances, particularly mixtures of polyvinylacetaldehydeacetal with methylpolyvinyl ether and/or salts of alkaline earths of polyacrylic acid, as well as mixtures of polyvinylacetaldehydeacetal with polyvinylformaldehydeacetal and/or polyvinylbutyraldehydeacetal, mixtures of partially acetalized polyvinylalcohol of various degrees of acetalization. Methylcellulose is also suitable. An intermediate layer is formed from such compounds in the manner described in the above given examples. Their behavior on changes in temperature is about the same as that of methyl polyvinyl ether. Said methyl polyvinyl ether, for instance, is soluble in water only at a temperature below 35° C. If said temperature is exceeded the originally transparent and almost colorless aqueous solution is converted into the gel state whereby it becomes opaque.

In place of the above mentioned polymers and compounds capable of forming products of addition with polymer compounds the following substances can also be used: hydrosols of methylpolyvinylether, of polyvinylacetaldehyeactal, of polyvinylbutyraldehydeacetal or of polyvinylalcohols partially acetalized with the respective aldehydes. These substances are so-called solvatized colloids having colloidal particles surrounded by an adsorptively held film of the dispersion agent i. e. water in this case. This film will be torn off when heated.

In the place of methanol as a water attracting solvent there may be used ethanol, ethylalcohol, diacetonealcohol, benzylalcohol, triethyleneglycol, glycol, glycerine, acetone and others.

As salt which has, in the anhydrous state, another color than in the hydrated state, there may be employed cobalt chloride, nickel chloride, nickel nitrate, copper chloride, copper nitrate, complex compounds of cobalt and mixtures of the same.

Indicator substances to be added to the intermediate layer may comprise, besides phenolphthaleine, cresol phthaleine, thymol phthaleine, methylviolet, litmus, p-nitraniline-azosalycilicsodium, phenolsulfophthaleine, o-cresolsulfophthaleine, m-cresolsulfophthaleine, thymolsulfophthaleine, m-nitrophenol and others. Especially suitable are such indicators which, either in the alkaline or in the acid range or in both ranges, exhibit an especially strong coloration.

In the place of benzaldehyde phenylhydrazone and anisil osazone there may be used as photochemically changeable substances to be admixed to the intermediate layer, nitrobenzaldehyde phenylhydrazones, toluylaldehyde phenylhydrazones and others more.

Substances which are capable of decreasing the temperature of conversion, i. e. the temperature at which gel formation takes place, are, besides glycerol and glycol, phenol, pentaethyleneglycol, hexaethyleneglycol, ester of phthalic acids such as dinormalbutylphthalate, ester of phosphoric acid such as tricresylphosphate and polysacharides such as cane sugar and ammonia.

Substances which are capable of hindering gel formation are, besides those mentioned in the specification, polyvinyl alcohol, ketones, such as acetone, ethyl alcohol, benzyl alcohol, diacetone alcohol, triethylene glycol, polyglycolbutylether and others.

Polyvinylbutyraldehydeacetal can be replaced as film forming substance with good results by polyvinylacetaldehydeacetal, being a polymer capable of absorbing more water than polyvinylbutyraldehydeacetal and therefore particularly adapted as interlayer if metal salts are being used.

I claim:

1. Multi-layer glass sheet comprising two glass plates and, interposed between said plates, an intermediate layer, said intermediate layer being substantially transparent and, on increase in temperature, becoming thermoreversibly opaque at a predetermined temperature, said intermediate layer being a solid containing a liquid producing component therein and comprising, as thermoreversible component, an adsorption compound of a polymerization product and a compound adsorbable by said polymerization product, said polymerization product and said adsorbable compound being composed so as to form said adsorption compound, said adsorption compound being optically homogeneous and substantially transparent below said predetermined temperature and, on increase in temperature, being reversibly split up into its components thereby forming an optically heterogeneous mixture of said components resulting in an opaque appearance of said intermediate layer, said intermediate layer being enclosed between said glass plates to substantially prevent evaporation of said adsorbable compound.

2. Multi-layer glass sheet according to claim 1, wherein the intermediate layer contains a substance having the property of absorbing light and converting said adsorbed light into heat.

3. Multi-layer glass sheet according to claim 1, wherein the intermediate layer contains an emulsifying agent.

4. Multi-layer glass sheet according to claim 1, wherein said absorbable compound is water.

5. Multi-layer glass sheet according to claim 1, wherein said thermoreversible component is a film of a film-forming polymerization product selected from the group consisting of methyl polyvinyl ether, an alkaline earth metal salt of polyacrylic acid, a polyvinyl aldehyde acetal, and a polyvinyl alcohol partly condensed to an acetal.

6. Multi-layer glass sheet according to claim 4, wherein said thermoreversible compound is a polyglycol ether.

7. Multi-layer glass sheet according to claim 5, wherein the intermediate layer contains an additional substance to adjust to a predetermined temperature the temperature at which conversion of the transparent intermediate layer into the opaque intermediate layer takes place.

8. Multi-layer glass sheet according to claim 7, wherein the additional substance adjusting the temperature of conversion is a ketone, said ketone increasing the temperature of conversion.

9. Multi-layer glass sheet according to claim 7, wherein the additional substance adjusting the temperature of conversion is ammonia, said ammonia decreasing the temperature of conversion.

10. Multi-layer glass sheet according to claim 7, wherein the additional substance adjusting the temperature of conversion is a compound selected from the group consisting of a monovalent aliphatic alcohol and a ketone, said compound increasing the temperature of conversion.

11. Multi-layer glass sheet according to claim 7, wherein the additional substance affecting the temperature of conversion is a compound selected from the group consisting of a polyvalent alcohol, phenol, and ammonia, said compound decreasing the temperature of conversion.

12. Multi-layer glass sheet comprising two glass plates and, interposed between said plates, an intermediate layer, said intermediate layer being substantially transparent at a temperature below 18° C. and, on increase in temperature, becoming thermoreversibly opaque at a predetermined temperature, said intermediate layer being a solid containing a liquid producing compound therein and comprising, as thermoreversible component, a film of methyl polyvinyl ether having water adsorbed thereto to form an adsorption compound consisting of said methyl polyvinylether and said water, said adsorption compound being optically homogeneous and substantially transparent at a temperature below 18° C. and, on increase in temperature, becoming thermoreversibly opaque, the water content of said methyl polyvinyl ether-water adsorption compound being adjusted to a predetermined amount so as to cause the intermediate layer, on increase in temperature, to become opaque at said predetermined temperature.

13. Multi-layer glass sheet according to claim 12, wherein said intermediate layer includes an aqueous agar gel.

14. Multi-layer glass sheet according to claim 4, wherein said thermoreversible component is a film of an alkaline earth metal salt of polyacrylic acid, and said predetermined temperature is below 18° C.

15. Multi-layer glass sheet according to claim 4, wherein said thermoreversible component is a film of a polyvinyl alcohol partly condensed with acetaldehyde to form a partly acetalized polyvinyl alcohol, and said predetermined temperature is below 18° C.

16. Multi-layer glass sheet according to claim 1, wherein there is more than one polymerization product and more than one adsorbable compound.

References Cited in the file of this patent

UNITED STATES PATENTS

| | | |
|---|---|---|
| 1,845,835 | Frankenburger | Feb. 16, 1932 |
| 2,249,538 | McDowell | July 15, 1941 |
| 2,335,659 | Fraenckel | Nov. 30, 1943 |
| 2,388,600 | Collins | Nov. 6, 1945 |
| 2,418,780 | Leverenz | Apr. 8, 1947 |
| 2,501,418 | Snowden | Mar. 21, 1950 |
| 2,524,960 | Cottet et al. | Oct. 10, 1950 |
| 2,555,646 | Jones | June 5, 1951 |
| 2,609,269 | Ryan | Sept. 2, 1952 |

FOREIGN PATENTS

| | | |
|---|---|---|
| 431,072 | Great Britain | July 1, 1935 |
| 455,851 | Great Britain | Oct. 26, 1936 |

OTHER REFERENCES

Journal of the Amer. Chem. Soc., vol. 57 (1935), pp. 1151–1159.